United States Patent
Yamawaki (10) Patent No.: US 12,052,607 B2
(45) Date of Patent: Jul. 30, 2024

(54) COMMUNICATION APPARATUS, COMMUNICATION METHOD, AND PROGRAM

(71) Applicant: NEC Corporation, Tokyo (JP)

(72) Inventor: Ai Yamawaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 565 days.

(21) Appl. No.: 17/280,228

(22) PCT Filed: Sep. 27, 2019

(86) PCT No.: PCT/JP2019/038093
§ 371 (c)(1),
(2) Date: Mar. 26, 2021

(87) PCT Pub. No.: WO2020/067403
PCT Pub. Date: Apr. 2, 2020

(65) Prior Publication Data
US 2022/0053373 A1     Feb. 17, 2022

(30) Foreign Application Priority Data
Sep. 28, 2018   (JP) .................. 2018-183816

(51) Int. Cl.
*H04W 28/08*   (2023.01)
*H04W 28/10*   (2009.01)

(52) U.S. Cl.
CPC ... *H04W 28/0942* (2020.05); *H04W 28/0983* (2020.05); *H04W 28/10* (2013.01)

(58) Field of Classification Search
CPC ..... H04W 24/08; H04W 24/02; H04W 24/00; H04W 28/0247; H04W 28/0284; H04W 88/02; H04W 88/08; H04W 28/02; H04W 28/0942; H04W 28/0983; H04W 28/10; H04W 28/18; H04W 4/50; H04W 72/56; H04W 92/02; G06F 3/061; G06F 3/0665;
(Continued)

(56) References Cited

U.S. PATENT DOCUMENTS 6,603,975 B1    8/2003   Inouchi et al.
2001/0029543 A1 * 10/2001  Iwata .................. H04L 45/302
                                                        709/225
(Continued)

FOREIGN PATENT DOCUMENTS

JP    2000-295276 A    10/2000
JP    2015-065601 A    4/2015
(Continued)

OTHER PUBLICATIONS

International Search Report for PCT Application No. PCT/JP2019/038093, mailed on Nov. 19, 2019.

*Primary Examiner* — The Hy Nguyen (57) ABSTRACT

A communication apparatus includes a bandwidth calculation part that calculates a bandwidth for each application, a change rate calculation part that calculates a bandwidth change rate for each application based on the bandwidth for each application presently calculated and the bandwidth for each application previously calculated, and a policy selection part that selects a policy to be applied to communication traffic between a server and a terminal based on the calculated bandwidth change rate for each application.

20 Claims, 9 Drawing Sheets

(58) Field of Classification Search
CPC ............ G06F 3/0655; G06F 2212/452; G06F 11/2025; G06F 9/45545; G06F 9/5077; G06F 9/46; G06F 9/50; H04L 47/20; H04L 47/11; H04L 43/0888; H04L 1/0002; H04L 1/0015; H04L 47/25; H04L 47/2475; H04L 43/00; H04L 43/0811; H04L 1/20; H04L 43/06; H04L 43/16; H04L 43/0876; H04L 47/10; H04L 47/15; H04L 47/263; H04L 47/30; H04L 47/762; H04L 47/70; H04L 47/781; H04L 47/767; H04L 47/803; H04L 47/783; H04L 47/822; H04L 67/1008; H04L 47/824
See application file for complete search history.

(56) References Cited

U.S. PATENT DOCUMENTS

| | | | | |
|---|---|---|---|---|
| 2013/0347024 | A1* | 12/2013 | Sugiue | H04N 21/4222 |
| | | | | 725/25 |
| 2014/0052847 | A1* | 2/2014 | Jadallah | H04L 41/0896 |
| | | | | 709/224 |
| 2014/0122919 | A1* | 5/2014 | Okada | G06F 11/2028 |
| | | | | 714/4.11 |
| 2015/0085651 | A1 | 3/2015 | Kudo et al. | |
| 2015/0089050 | A1 | 3/2015 | Kudo et al. | |
| 2015/0256663 | A1* | 9/2015 | Takikawa | H04B 1/3822 |
| | | | | 455/418 |
| 2015/0268981 | A1 | 9/2015 | Kaneko | |
| 2016/0036710 | A1* | 2/2016 | Hanaoka | H04W 24/02 |
| | | | | 370/235 |

FOREIGN PATENT DOCUMENTS

| | | |
|---|---|---|
| JP | 2015-065602 A | 4/2015 |
| JP | 2015-111778 A | 6/2015 |
| JP | 2015-184734 A | 10/2015 |
| JP | 2016-036061 A | 3/2016 |
| JP | 2017-063488 A | 3/2017 |
| JP | 2017-142673 A | 8/2017 |
| JP | 2018195208 A * | 12/2018 |

* cited by examiner

BANDWIDTH MANAGEMENT TABLE

Cell ID=1

| No | APPLICATION | PREVIOUS BANDWIDTH | LATEST BANDWIDTH | USAGE GROWTH RATE |
|---|---|---|---|---|
| 1 | Twitter | A1[Mbps] | A2[Mbps] | 20% |
| 2 | YouTube | B1[Mbps] | B2[Mbps] | 2% |
| 3 | IP TELEPHONE | C1[Mbps] | C2[Mbps] | 10% |
| ... | ... | ... | ... | ... |

Cell ID=2

| No | APPLICATION | PREVIOUS BANDWIDTH | LATEST BANDWIDTH | USAGE GROWTH RATE |
|---|---|---|---|---|

Cell ID=3

| No | APPLICATION | PREVIOUS BANDWIDTH | LATEST BANDWIDTH | USAGE GROWTH RATE |
|---|---|---|---|---|

| TIME | FIRST | SECOND | THIRD | |
|---|---|---|---|---|
| T1 | Twitter | IP TELEPHONE | YouTube | ... |
| T2 | Twitter | Web | Mail | ... |
| T3 | Twitter | IP TELEPHONE | Web | ... |

FIG. 8

POLICY MANAGEMENT TABLE

| APPLICATION | COMPRESSION | COMPRESSION RATE | PAGING | PAGING RATE |
|---|---|---|---|---|
| Twitter | × (UNNECESSARY) | — | × (UNNECESSARY) | — |
| YouTube | ○ (NECESSARY) | D1% | ○ (NECESSARY) | D2[Mbps] |
| IP TELEPHONE | ○ (NECESSARY) | D2% | × (UNNECESSARY) | — |
| ... | ... | ... | ... | ... |

FIG. 9

COMMUNICATION APPARATUS, COMMUNICATION METHOD, AND PROGRAM

This application is a National Stage Entry of PCT/JP2019/038093 filed on Sep. 27, 2019, which claims priority from Japanese Patent Application 2018-183816 filed on Sep. 28, 2018, the contents of all of which are incorporated herein by reference, in their entirety.

FIELD

Reference to Related Application

The present invention is based upon and claims the benefit of the priority of Japanese patent application No. 2018-183816 filed on Sep. 28, 2018, the disclosure of which is incorporated herein in its entirety by reference thereto.
The present invention relates to a communication apparatus, communication method, and program.

BACKGROUND

In recent years, a traffic data amount has continued to increase due to an increase in speed of a mobile network and increase in richer Internet contents (contents inclusive of many videos, etc.). Thus, on occurrence of such an event that causes users to be concentrated in a certain area, traffic will increase rapidly (accompanied with decrease in an available network bandwidth) and a download speed and image quality of data will decrease. As a result, QoE (Quality of Experience) of a user is degraded.

Patent Literature (PTL) 1 discloses a configuration that improves QoE for a subscriber's mobile terminal by having a traffic management server control a base station according to application information and instructing the core network side to control traffic for a specific application of a specific user in cooperation with information on a wireless area calculated by a base station management server.

PTL 2 discloses a technology that controls traffic by selecting a connection policy based on traffic and a congestion level of each application and applying a policy to each user. An application/infrastructure linkage server detects a type of an application that is active on a specific mobile information terminal and sets a connection policy corresponding to an application type in a bandwidth control router along with information identifying a mobile information terminal, and a bandwidth control router forwards a packet from a specified mobile information terminal with priority control or using a predetermined priority communication bandwidth according to a connection policy set by the application/infrastructure linkage server. A line communication congestion level is calculated for each application based on the data traffic amount of the application, and a congestion level display interface for displaying the congestion level to the user is generated.

PTL 1: Japanese Unexamined Patent Application Publication No. JP2016-036061A
PTL 2: Japanese Unexamined Patent Application Publication No. JP2017-063488A

SUMMARY

The disclosure of each literature cited above is incorporated herein in its entirety by reference thereto. The following analysis is given by the present inventors.

When a sudden event such as an accident or disaster occurs, many users try to obtain information from an SNS (Social Networking Service) such as Twitter (a trademark or registered trademark of Twitter, Inc.; the same shall apply hereinafter). However, since a large number of users try to access a network, the network becomes congested. As a result, users are not able to obtain necessary information and QoE decreases due to a communication delay. Such non-communication of information may become a social issue.

For example, when the 2011 Tohoku earthquake and tsunami occurred, many users uses Twitter as information source. But, users could not get necessary information from Twitter due to network congestion, which was one of causes of a confusion.

In addition to technologies such as the one disclosed in PTL 1 aimed at improving QoE, there is also a technology designed to solve a network congestion. One of the examples is a technology (technique) that receives an alarm from a base station, identifies an application affecting call control, and limits a bandwidth of a user (terminal) using the application identified.

This technology identifies an application having a high usage rate based on a usage amount (consumption of a network bandwidth) of the application. However, when determination based on the usage amount of the application is adopted, there may be a case where it is difficult to detect a change in a network, because large-size contents such as videos occupy a bandwidth. Further, for example, in a case where a behavior of an application is decided based on a data traffic amount as described in PTL 2, since a video application such as YouTube (a registered trademark; the same shall apply hereinafter) has large-size contents (large data amount), a bandwidth amount consumed by these videos will be large. As a result, even when there is an increase in the number of users who use an application with small-size contents such as a Web browser and SNS, it will be difficult to detect the increased users.

That is, with a technology such as one disclosed in PTL 2, it is difficult to detect a change in a communication state of a network when the number of users on SNS or the like increases suddenly (unexpectedly) and the network is congested.

The above existing technology is effective when a user continuously stays in the same area. However, it is conceivable that the user may move outside an optimized area regardless of user's intention, such as movement by car or train. In this case, packet loss or the like will occur, and user's QoE will be degraded. In more detail, even if "Twitter" is set to be prioritized for an area where a large-scale disaster occurs, if the user moves out of the area, the priority setting for Twitter will no longer be applied. As a result, a user who moves out of the area may not be able to get information the user needs from Twitter.

It is a main object of the present invention to provide a communication apparatus, communication method, and program each capable of contributing to improvement of QoE of a user against an event such as a sudden occurrence of congestion in a network.

According to a first aspect of the present invention or the present disclosure, there is provided a communication apparatus including a bandwidth calculation part that calculates a bandwidth for each application, a change rate calculation part that calculates a bandwidth change rate for each application based on the bandwidth for each application presently calculated by the bandwidth calculation part and the bandwidth for each application previously calculated thereby; and a policy selection part that selects a policy to be applied to communication traffic between a server and a terminal based on the bandwidth change rate for each application.

According to a second aspect of the present invention or the present disclosure, there is provided a communication method for a communication apparatus that relays communication between a server and a terminal, the communication method including:

calculating a bandwidth for each application;

calculating a bandwidth change rate for each application based on a presently calculated bandwidth for each application and a previously calculated bandwidth for each application; and selecting a policy to be applied to communication traffic between the server and the terminal based on the bandwidth change rate for each application.

According to a third aspect of the present invention or the present disclosure, there is provided a program causing a computer included in a communication apparatus that relays communication between a server and a terminal to execute processing including:

calculating a bandwidth for each application;

calculating a bandwidth change rate for each application based on a presently calculated bandwidth for each application and a previously calculated bandwidth for each application; and selecting a policy to be applied to communication traffic between the server and the terminal based on the bandwidth change rate for each application.

According to the present invention, there is provided a computer-readable storage medium (non-transitory medium) storing the program relating to the third aspect. The storage medium may be a non-transient one such as a semiconductor memory, a hard disk, a magnetic recording medium, and an optical recording medium.

According to each aspect of the present invention, there is provided a communication apparatus, communication method, and program each capable of contributing to improvement of QoE of a user against an event such as a sudden occurrence of congestion in a network.

DETAILED DESCRIPTION

First, an aspect of several example embodiments will be described. It should be noted that drawing reference signs in this outline are given to each element for convenience as an example to facilitate understanding and the description in the outline is not intended to limit the present invention in any way. Further, connection lines between blocks in the drawings can be both bidirectional and unidirectional. A unidirectional arrow schematically shows a main flow of a signal (data) and does not exclude bidirectionality. Further, in a circuit diagram, block diagram, internal configuration diagram, and connection diagram shown in the disclosure of the present application, input and output ends of each connection line have an input port and an output port, respectively, although not shown explicitly. The same applies to input/output interfaces.

Figure 1:
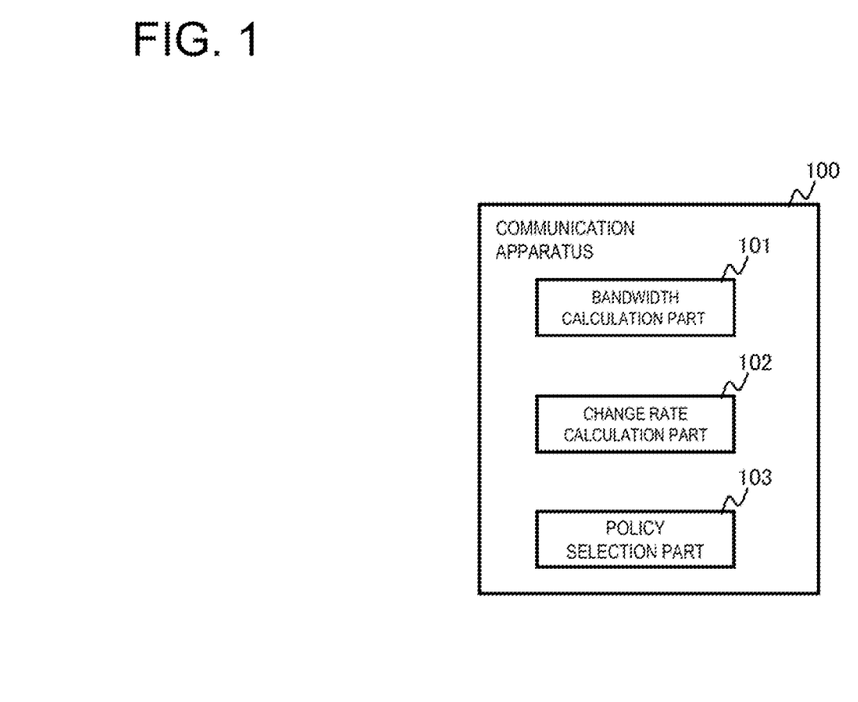
FIG. 1 is a diagram illustrating an outline of an example embodiment.

A communication apparatus 100 according to an example embodiment includes a bandwidth calculation part 101, a change rate calculation part 102, and a policy selection part 103 (refer to FIG. 1). The bandwidth calculation part 101 calculates a bandwidth of each application. The bandwidth calculation part 101 may calculate the bandwidth for each application by identifying an application from communication traffic and aggregating a traffic amount of each application during a prescribed time period. The change rate calculation part 102 calculates a change rate of the bandwidth (referred to as "bandwidth change rate") for each application during a prescribed time period based on the calculated bandwidth for each application. The change rate calculation part 102 may calculate the bandwidth change rate for each application based on the bandwidth for each application calculated previously by the bandwidth calculation part 101, as a reference value, for the bandwidth for each application calculated this time by the bandwidth calculation part 101. The policy selection part 103 selects a policy to be applied to a communication traffic between a server and a terminal based on the calculated bandwidth change rate for each application.

The communication apparatus 100 calculates a traffic amount (bandwidth) for each application periodically and detects a sudden event by monitoring the bandwidth change rate (usage growth rate) for each application. For example, a video application such as YouTube consumes relatively large bandwidth during the prescribed time period. In contrast, an SNS such as Twitter consumes relatively small bandwidth. Therefore, an attempt to determine a state of a network based on a bandwidth (usage amount) for each application during the prescribed time period results in overlooking an application that is growing in usage. For this reason, the communication apparatus 100 is able to accurately grasp a situation where usage of an application with small bandwidth consumption, such as Twitter, is rapidly increasing by calculating a usage growth rate (bandwidth change rate) for each application during the prescribed time period. The communication apparatus 100 according to the example embodiment is capable of improving QoE of a user by implementing traffic control corresponding to an accurately grasped situation.

Specific example embodiments will be described in more detail with reference to the drawings. Note that the same reference signs are given to the same elements in each example embodiment, and the description thereof will be omitted.

First Example Embodiment

A first example embodiment will be described in detail with reference to the drawings.

Figure 2:
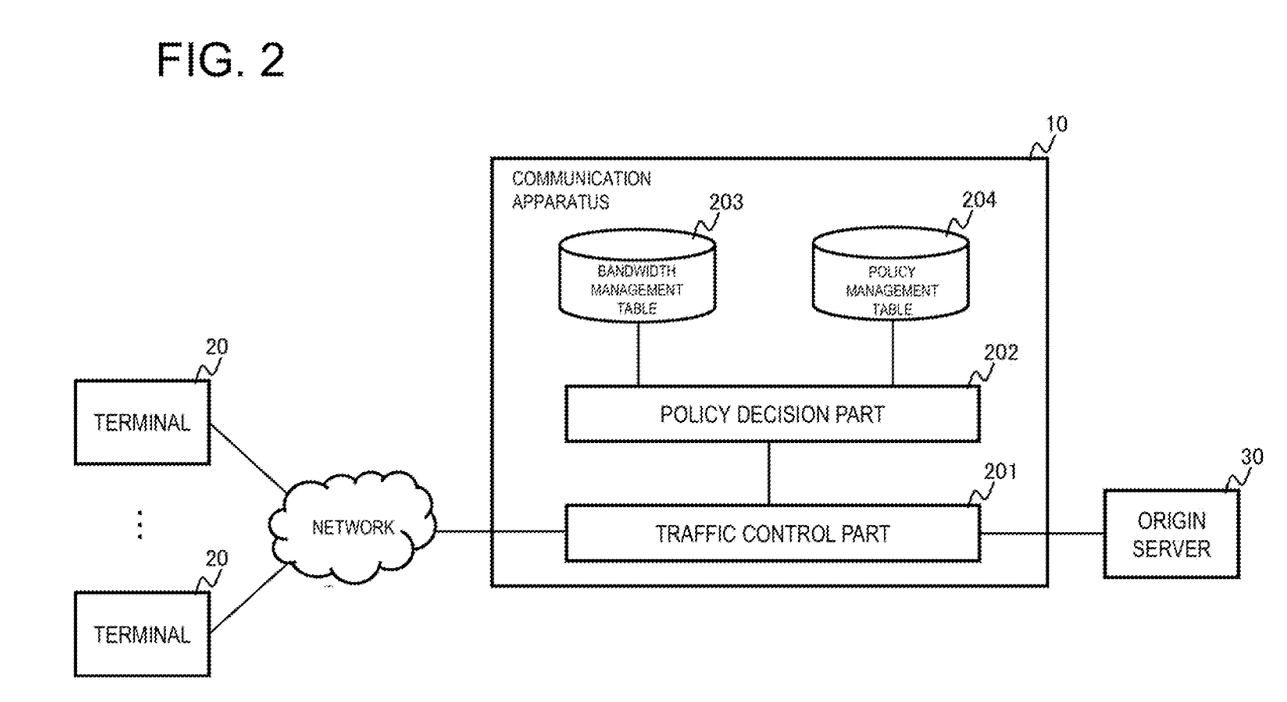
FIG. 2 is a diagram illustrating a schematic configuration example of a communication system relating to a first example embodiment.

FIG. 2 is a diagram illustrating a schematic configuration example of a communication system according to the first example embodiment. Referring to FIG. 2, the communication system is configured to include a communication apparatus 10, a plurality of terminals 20, and an origin server 30.

The communication apparatus 10 is an apparatus that relays communication between the terminals 20 and the origin server 30 that holds and derivers contents. The communication apparatus 10 variously controls communication traffic between the terminals 20 and the origin server 30. For example, the communication apparatus 10 has a traffic control function for performing compression and paging delivery of still image, video, and text contents. Further, the communication apparatus 10 has a function for obtaining SNI (Server Name Indication) and is able to identify an application from communication traffic even in encrypted HTTPS (Hypertext Transfer Protocol Secure) communication. The communication apparatus 10 includes a function for calculating a bandwidth of each application on a per base station and calculating a bandwidth usage growth rate (bandwidth change rate).

The usage growth rate of an application is a rate at which traffic of the application changes during a prescribed time period. Alternatively, the usage growth rate of an application is a rate at which a network bandwidth consumed by packets used by the application changes during a prescribed time period.

The terminal 20 is a terminal including a wireless communication function. More specifically, the terminal 20 accesses a network via a base station (not shown) and obtains contents data from the origin server 30.

Referring to FIG. 2, the communication apparatus 10 is configured to include a traffic control part 201, a policy decision part 202, a bandwidth management table 203, and a policy management table 204.

The traffic control part 201 controls traffic between the terminals 20 and the origin server 30. The traffic control part 201 controls traffic according to a policy selected by the policy decision part 202. More specifically, the traffic control part 201 performs compression control to compress contents data for each application for transmission to the terminals 20 and paging control (bandwidth control) to restrict a communication bandwidth to a predetermined value or less.

The policy decision part 202 determines a policy regarding traffic control to be applied to communication between the terminals 20 and the origin server 30. The policy decision part 20 refers to a bandwidth of each application stored in the bandwidth management table 203 and calculates a usage growth rate of each application. The policy decision part 202 determines a policy based on the calculated usage growth rate.

The policy decision part 202 grasps a change in the usage growth rate for each application in real time, and if there is a significant increase in a usage number of an applications, selects a policy (optimization policy) that adopts traffic control that prioritizes a communication of the relevant application.

The bandwidth management table 203 is a table that holds bandwidth for an identifier of each base station and for each application. The policy management table 204 is a table that holds a policy to be applied to each application. The following described details of the bandwidth management table 203 and the policy management table 204 will be described along with an operation of the communication apparatus 10.

Figure 3:
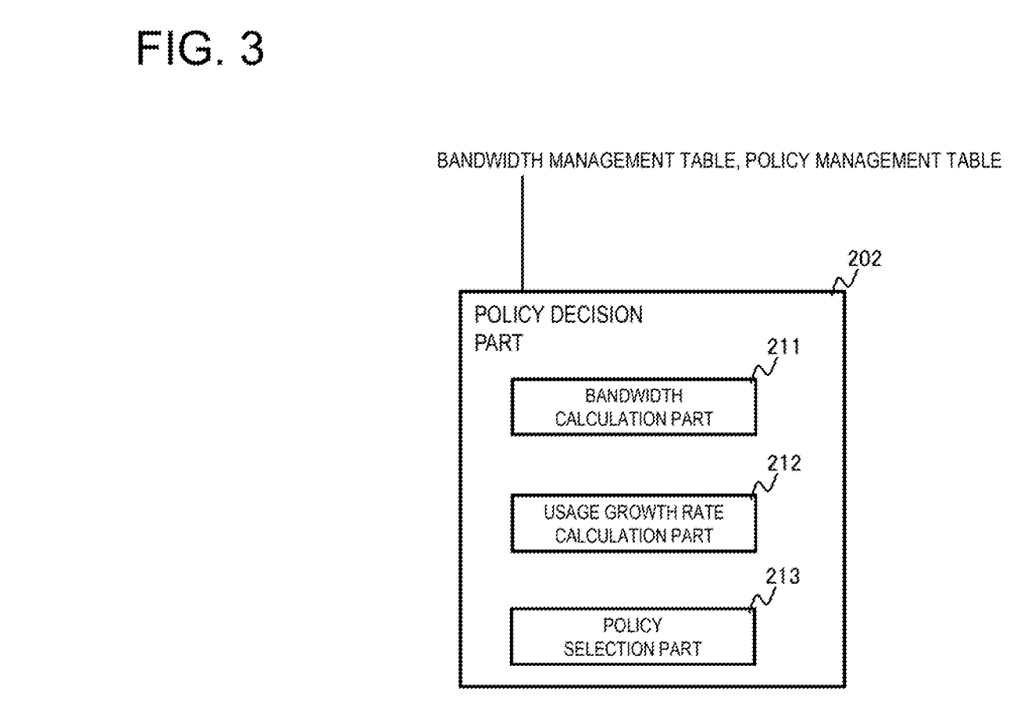
FIG. 3 is a diagram illustrating an example of an internal configuration of a policy decision part according to the first example embodiment.

FIG. 3 is a diagram illustrating an example of an internal configuration of the policy decision part 202. Referring to FIG. 3, the policy decision part 202 is configured to include a bandwidth calculation part 211, a usage growth rate calculation part 212, and a policy selection part 213. The bandwidth calculation part 211, the usage growth rate calculation part 212, and the policy selection part 213 in FIG. 3 corresponds to the bandwidth calculation part 101, the change rate calculation part 102, and the policy selection part 103 in FIG. 1, respectively.

The bandwidth calculation part 211 calculates a bandwidth of each application. More specifically, the bandwidth calculation part 211 checks a port number and a payload obtained from a packet transmitted by each terminal 20 and identifies an application corresponding to the received packet. The bandwidth calculation part 211 measures a size of a received packet for each application and stores the size in an internal storage part or the like. Then, the bandwidth calculation part 211 calculates a sum of packet sizes measured during a prescribed time period (sampling period; for example, one minute) as a bandwidth of each application. Similarly, for packets (downlink packets) forwarded from the origin server 30 to the terminals 20, the bandwidth calculation part 211 measures a size of a received packet for each application and calculates a sum of packet sizes measured during a prescribed time period (sampling period; for example, one minute) as a bandwidth of each application. The bandwidth calculation part 211 may derive the number of bits per unit time (bits per second) obtained by dividing the sum (the number of bits) of packet sizes by the prescribed time period (60 seconds) as the bandwidth.

The usage growth rate calculation part 212 calculates a usage growth rate (bandwidth change rate) for each application during the prescribed time period (sampling period; for example, one minute) based on the calculated bandwidth for each application. More specifically, at a predetermined timing (for example, every minute), the usage growth rate calculation part 212 calculates a difference (X2−X1) between a bandwidth X1 (reference value) calculated immediately before and a latest bandwidth X2 presently calculated and calculates the usage growth rate (bandwidth change rate) for each application (=X2−X1)/X1×100(%)) by dividing this difference by the bandwidth X1 (reference value) calculated immediately before. Further, the usage growth rate calculation part 212 calculates the bandwidth usage growth rate for each application, every prescribed time period (sampling period; for example, one minute).

The policy selection part 213 selects a policy to be applied to the communication traffic between the origin server 30 and the terminals 20 based on the calculated usage growth rate (bandwidth change rate) for each application. More specifically, the policy selection part 213 refers to the policy management table 204, selects an optimum policy for a current communication status based on the calculated usage growth rate for each application, and outputs the selected policy to the traffic control part 201. That is, the policy selection part 213 updates a policy used by the traffic control part 201 to control traffic.

Figure 4:
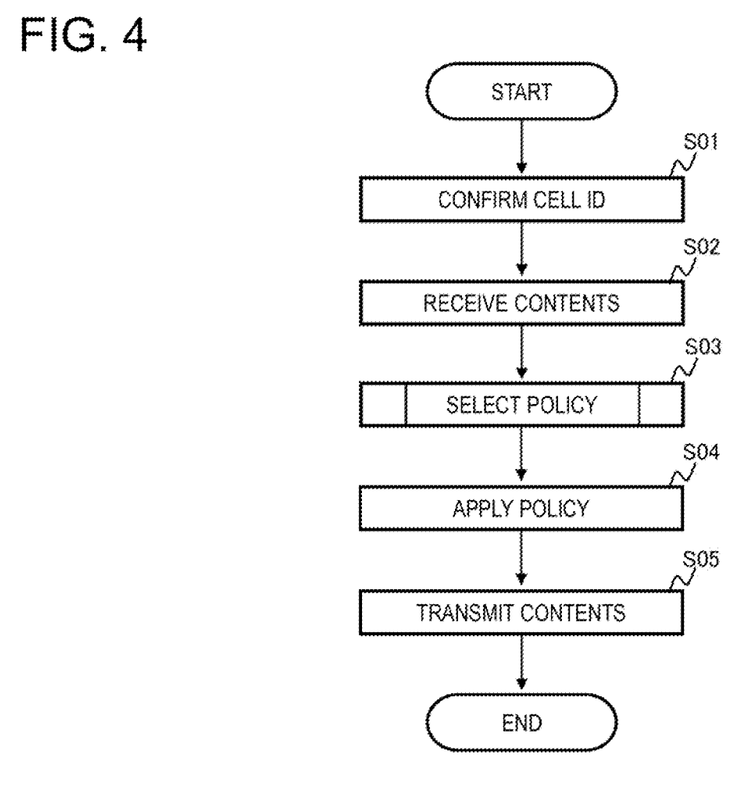
FIG. 4 is a flowchart illustrating an example of the operation of a communication apparatus according to the first example embodiment.

FIG. 4 is a flowchart illustrating an example of an operation of the communication apparatus 10 according to the first example embodiment.

First, when a user (the terminal 20) connects to the origin server 30 (when the communication apparatus 10 receives a packet from the terminal 20 and relays the packet to the origin server 30), the communication apparatus 10 obtains a CellID (Cell Identification) from the received packet (step S01). A CellID identifies a base station in a wireless communication network. The communication apparatus 10 manages a usage growth rate for each application for each CellID (each base station) to implement an optimal traffic control according to the usage growth rate. Further, the terminal 20 may set the CellID obtained by the terminal 20 when making a wireless connection via a base station, for example, in an option field of a packet header, and the communication apparatus 10 may obtain the CellID by referring to this option field.

Next, the communication apparatus 10 receives contents data (packets) from the origin server 30 (step S02).

The communication apparatus 10 selects a policy when receiving the contents data from the origin server 30 (step S03). The policy selection operation of the communication apparatus 10 will be described later.

The communication apparatus 10 performs traffic control according to a policy selected by the traffic control part 201 (step S04: APPLY POLICY).

The communication apparatus 10 transmits the contents data to the terminal 20 (step S05).

As described above, the traffic control part 201 in the communication apparatus 10 selects an optimum policy for a present communication status and environment, performs traffic control according to the selected policy, and transmits contents data to the user (terminal 20).

It is noted that in selection of an optimization policy by the policy selection part 213, in addition to determination of whether or not compression and paging functions are applied, compression rate and paging rate are determined. In other words, each policy not only indicates whether or not the compression and paging functions is applied, but also includes information about values (compression and paging rates) when these functions are made effective.

Figure 5:
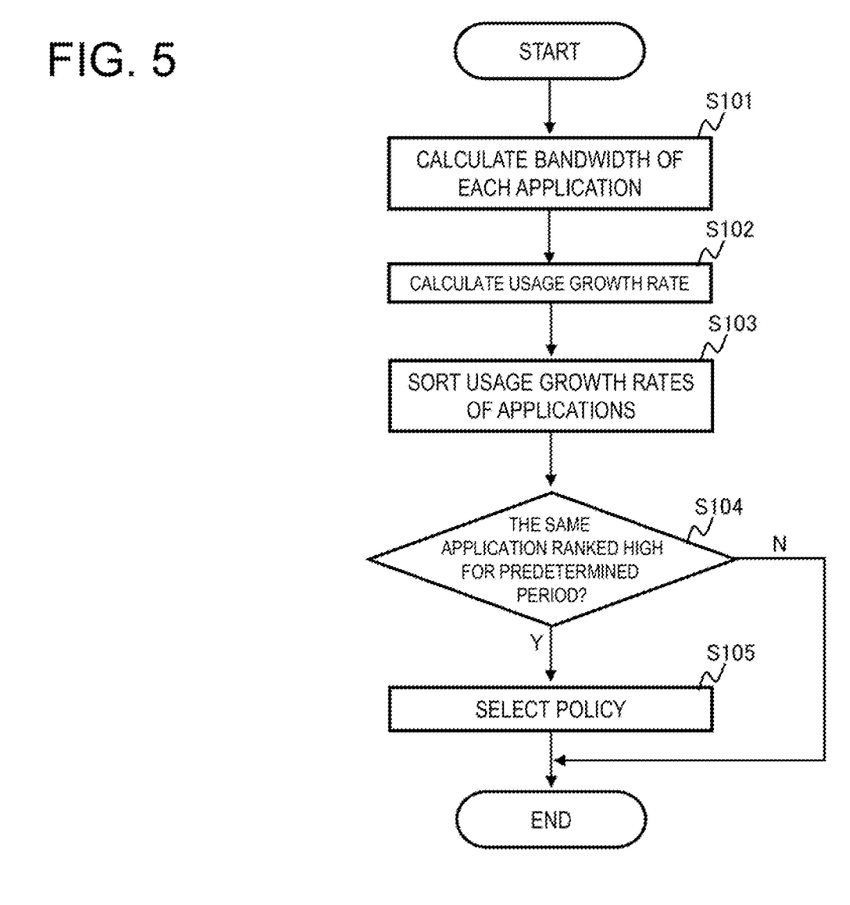
FIG. 5 is a flowchart illustrating an example of an optimization policy selection operation according to the first example embodiment.

FIG. 5 is a flowchart illustrating an example of an optimization policy selection operation of the communication apparatus 10. It is noted that the optimization policy selection operation of the communication apparatus 10 is activated in a predetermined cycle (for example, every minute) without cooperation with call processing.

The bandwidth calculation part 211 calculates a bandwidth for each application for the same CellID and stores the calculated bandwidth in the bandwidth management table 203 (step S101). That is, the bandwidth calculation part 211 calculates the bandwidth for each application for an identifier of each base station to which the terminals 20 wirelessly connect.

Figure 6:
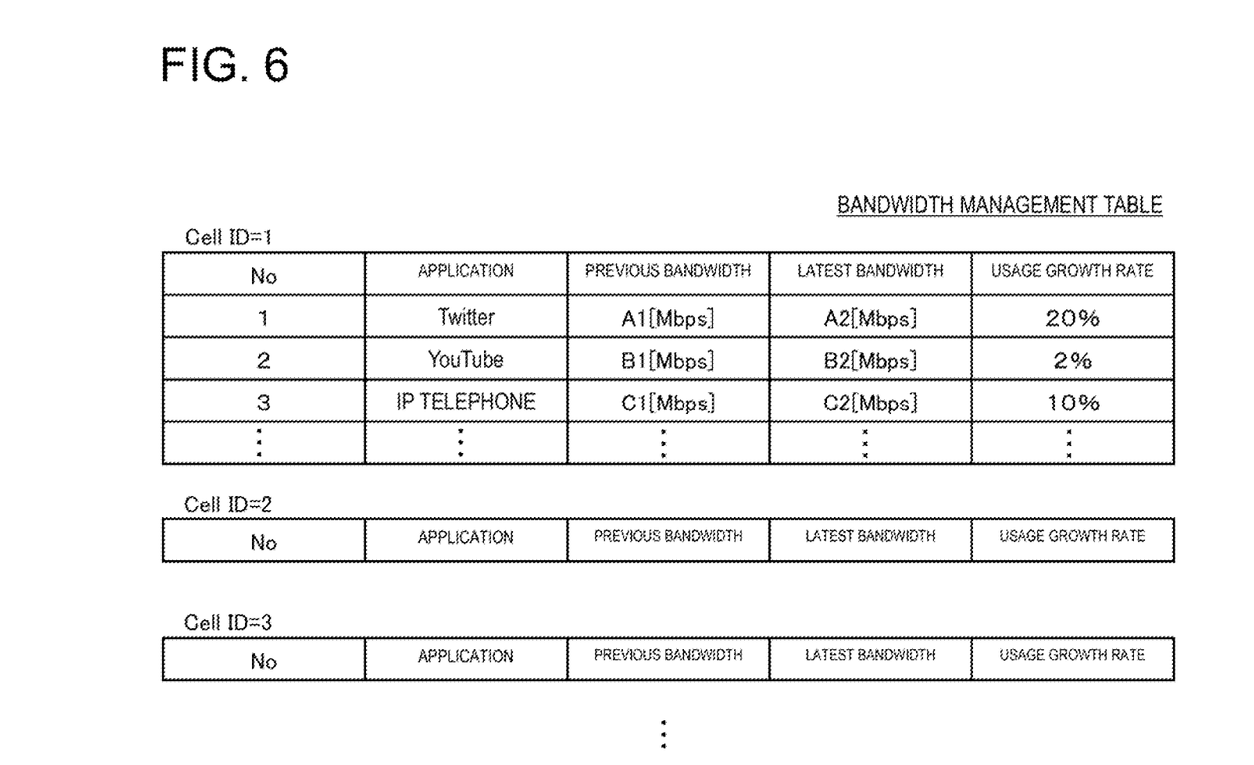
FIG. 6 is a diagram showing an example of a bandwidth management table.

FIG. 6 is a diagram illustrating an example of the bandwidth management table. As illustrated in FIG. 6, the bandwidth management table 203 includes bandwidths (a previous bandwidth and a latest bandwidth) and a usage growth rate calculated for each CellID and for each application.

The usage growth rate calculation part 212 calculates the bandwidth usage growth rate (bandwidth change rate) for each application based on the bandwidth stored in the bandwidth management table 203 (the bandwidth (Mbps (megabits per second)) previously calculated) and the latest bandwidth (step S102). The usage growth rate calculation part 212 stores the bandwidth usage growth rate calculated for each application in the bandwidth management table 203.

In the example of FIG. 6, for CellID 1, the usage growth rates of Twitter, YouTube, and the IP (Internet Protocol) telephone are calculated to be 20%, 2%, and 10%, respectively.

Next, the usage growth rate calculation part 212 executes sort processing on the bandwidth usage growth rate for each application (step S103). The usage growth rate calculation part 212 stores the calculated usage growth rate for each application each time it executes the sort processing.

For example, in the example of CellID 1, the applications are sorted in a descending order of the usage growth rate: Twitter, IP telephone, and YouTube. The usage growth rate calculation part 212 performs the sort processing, each time when calculating the usage growth rate for each application, and stores the sorted order.

The policy selection part 213 determines whether or not there is any application which is ranked higher than a predetermined ranking over a prescribed time period (for example, three minutes or three sampling periods), among applications sorted based on the usage growth rate for each application (step S104). That is, the policy selection part 213 determines whether or not applications ranked high in the usage growth rate rankings are the same over the prescribed time period (for example, three minutes or three sampling periods).

When there is an application ranked high for the prescribed time period (for example, three minutes) (YES in the step S104), the policy selection part 213 determines that this application is to be prioritized and selects a policy to be applied to traffic control thereof (step S105).

More specifically, the policy selection part 213 refers to the policy management table 204 and selects a policy corresponding to the application determined to be prioritized.

Figure 7:
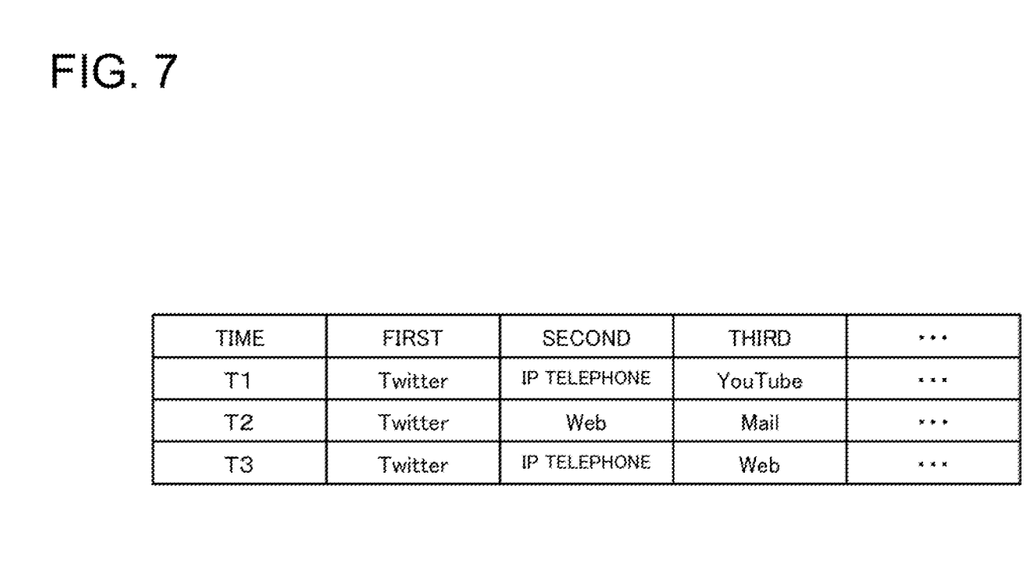
FIG. 7 is a drawing for explaining an operation of the communication apparatus according to the first example embodiment.

FIG. 7 is a diagram illustrating an example in which usage growth rates of applications calculated at a latest time (T3) and two earlier sampling periods (T2 and T1) are sorted. Referring to FIG. 7, Twitter is ranked within top three over a prescribed time period (for example, three minutes or three sampling periods). As a result, the policy selection part 213 determines that Twitter is to be prioritized.

Figure 8:
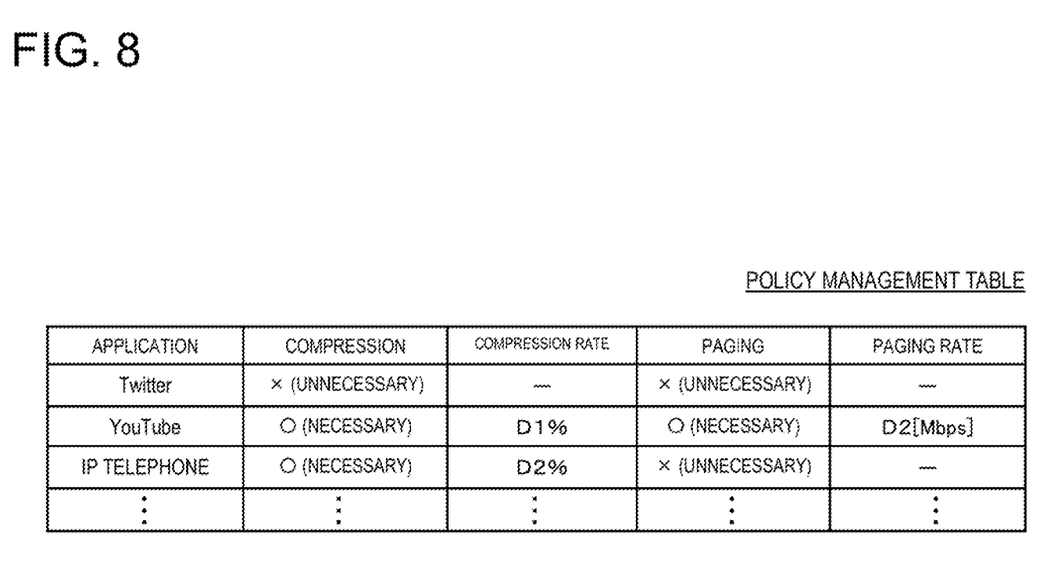
FIG. 8 is a diagram showing an example of a policy management table.

FIG. 8 is a diagram illustrating an example of the policy management table 204. When, as described above, Twitter is selected as an application that is to be prioritized, the policy selection part 213 reads a traffic control policy with respect to Twitter and provides (outputs) the policy to the traffic control part 201.

When there is no application ranked high for a prescribed time period (for example, three minutes or three sampling periods) (NO in the step S104), the policy selection part 213 ends processing thereof.

For example, when the usage growth rate of Twitter is ranked first over three consecutive times, the communication apparatus 10 removes a bandwidth limit setting for Twitter. Alternatively, the communication apparatus 10 may impose a stronger bandwidth limit on YouTube and other applications, while removing the bandwidth limit setting for Twitter. In this case, for example, the policy management table 204 may include details about traffic control for each of other applications when "Twitter" is prioritized. Alternatively, when a policy is only set for an application that is to be prioritized as illustrated in FIG. 8, a bandwidth limit may be uniformly imposed on other applications.

The policy selection part 213, as described above, sorts bandwidth change rates of applications in descending order and selects a policy to be applied to communication traffic based on the sorted bandwidth change rates. More specifically, the policy selection part 213 selects, as an application to be prioritized, an application corresponding to a bandwidth change rate higher than a predetermined ranking over a prescribed time period (for example, three minutes or three sampling periods) and reads a policy corresponding to the application to be prioritized from the policy management table 204. Then, the policy selection part 213 provides the policy to the traffic control part 201 as an "optimum policy".

[Hardware]

Next, a hardware configuration of each apparatus constituting the communication system will be described.

Figure 9:
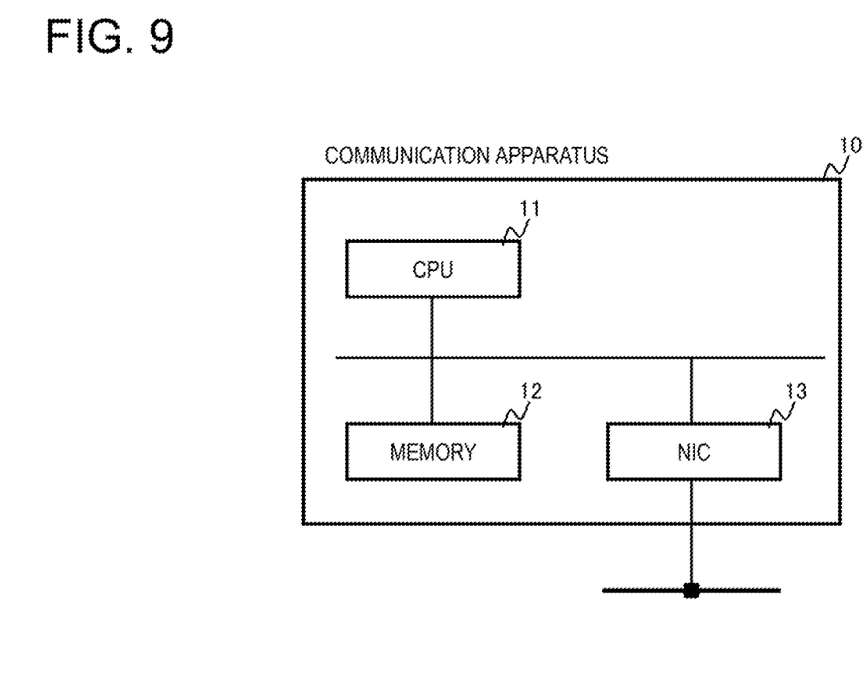
FIG. 9 is a diagram illustrating an example of the hardware configuration of the communication apparatus according to the first example embodiment.

FIG. 9 is a diagram illustrating an example of a hardware configuration of the communication apparatus 10. The communication apparatus 10 includes the configuration illustrated in FIG. 9. For example, the communication apparatus 10 includes a CPU (Central Processing Unit) 11, a memory 12, and a NIC (Network Interface Card) 13, which is communication means. These elements are interconnected by an internal bus.

The hardware configuration of the communication apparatus 10 is, as a matter of course, not limited to the configuration shown in FIG. 9. The communication apparatus 10 may include hardware not illustrated in the drawing. The number of CPUs included in the communication apparatus 10 is not limited to the illustration in FIG. 9 and the communication apparatus 10 may be configured to include a plurality of the CPUs 11.

The memory 12 may be a RAM (Random Access Memory), ROM (Read-Only Memory), or auxiliary storage apparatus (such as a hard disk).

The functions of the communication apparatus 10 are realized by the processing modules described above. For example, the processing modules are realized by having the CPU 11 read and execute a program stored in the memory 12. Further, this program may be downloaded via a network or updated using a storage medium storing the program. In addition, the processing modules may be realized by a semiconductor chip(s). That is, the functions performed by the processing modules may be realized by some kind of hardware or by software running on hardware.

Since the hardware configurations of the terminal 20 and the origin server 30 are obvious to those skilled in the art, the detailed description thereof will be omitted.

As described above, the communication apparatus 10 according to the first example embodiment classifies a packet transmitted by the terminal 20 accommodated in a specific area (cell provided by a base station) based on an application and calculates a bandwidth for each application. Further, the communication apparatus 10 detects a sudden event by calculating a usage growth rate for each application every prescribed time period (for example, one minute) based on the bandwidth for each application. The communication apparatus 10 performs traffic control enabling to provide prioritized communication to an application often used during an unexpected event. In this way, the communication apparatus 10 improves user's QoE. That is, the communication apparatus 10 improves the user's QoE by controlling traffic according to a user's priority level, for example, in an event of sudden network congestion. In doing so, the communication apparatus 10 imposes a stricter restriction on an application(s) with a lower priority to secure a necessary bandwidth. As a result, the present method makes it possible to control traffic in a fluctuating communication environment, such occurrence and elimination of network congestion, in a manner suited to a state of the network.

[Variation]

It should be noted that the configuration and the operation of the communication system described in the example embodiment are examples and are not intended to limit the configuration and the operation of the system. For example, the bandwidth management table 203 and/or the policy management table 204 may be constructed in a database server in a network accessible by the communication apparatus 10, instead of being provided in the communication apparatus 10.

In the example embodiment above, a usage growth rate for each application is calculated based on a bandwidth, however, a usage growth rate may be calculated based on the number of packets transmitted/received in a prescribed time period.

Further, it may be conceived that when a bandwidth usage growth rate of a specific application increases exponentially, the usage growth rate will decrease after a certain period of time. For example, about an hour after an occurrence of a large-scale disaster, a usage growth rate may decrease since a large number of users are already using the application in question. In this case, however, a demand for usage of this application continues to be high. Therefore, when a usage growth rate exceeds a threshold value, the communication apparatus 10 may select a policy that prioritizes the application for a certain period of time.

The industrial applicability of the present invention is clear from the above description. The present invention is suitably applicable to, for example, a proxy server installed in an IP network of a mobile telecommunications carrier.

Some or all of the example embodiments above can be described as (but not limited to) the following Supplementary Notes.

[Supplementary Note 1]

As the communication apparatus according to the first aspect.

[Supplementary Note 2]

The communication apparatus preferably as defined in Supplementary Note 1 further including a traffic control part that controls the communication traffic according to the selected policy.

[Supplementary Note 3]

The communication apparatus preferably as defined in Supplementary Note 2, wherein the change rate calculation part calculates the bandwidth change rate for each application on a regular basis.

[Supplementary Note 4]

The communication apparatus preferably as defined in Supplementary Note 3, wherein the policy selection part sorts the bandwidth change rate for each application in descending order of the change rates and selects a policy to be applied to the communication traffic based on the sorted bandwidth change rates.

[Supplementary Note 5]

The communication apparatus preferably as defined in Supplementary Note 4 further including a policy management table that holds a policy to be applied to each application, wherein the policy selection part selects, as a prioritized application, an application corresponding to the bandwidth change rate ranked higher than a predetermined ranking over a prescribed time period and reads a policy corresponding to the prioritized application from the policy management table.

[Supplementary Note 6]

The communication apparatus preferably as defined in Supplementary Note 5, wherein the policy selection part provides the policy read from the policy management table to the traffic control part.

[Supplementary Note 7]

The communication apparatus preferably as defined in any one of Supplementary Notes 1 to 6, wherein the bandwidth calculation part calculates the bandwidth for each application for an identifier of each base station to which a terminal wirelessly connects.

[Supplementary Note 8]

The communication apparatus preferably as defined in Supplementary Note 7 further including a bandwidth management table that holds the bandwidth for each application and the identifier of each base station.

[Supplementary Note 9]

The communication apparatus preferably as defined in Supplementary Note 2, wherein the traffic control part performs compression control or paging control.

[Supplementary Note 10]

The communication apparatus preferably as defined in Supplementary Note 5, wherein whether or not compression control is necessary, the compression rate, whether or not paging control is necessary, and the paging rate are stored in the policy management table in association with each application.

[Supplementary Note 11]

As the communication method according to the second aspect.

[Supplementary Note 12]

As the program relating to the third aspect.

Further, like the mode of Supplementary Note 1, the modes of Supplementary Notes 11 and 12 can be developed into the modes of Supplementary Notes 2 to 10.

Further, the disclosure of each Patent Literature cited above is incorporated herein in its entirety by reference thereto and can be used as a basis or a part of the present invention as needed. It is to be noted that it is possible to modify or adjust the example embodiments or examples within the scope of the whole disclosure of the present invention (including the claims) and based on the basic technical concept thereof. Further, it is possible to variously combine or select (or partially remove) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the claims, and the technical concept of the present invention. Particularly, any numerical ranges disclosed herein should be interpreted that any intermediate values or subranges falling within the disclosed ranges are also concretely disclosed even without specific recital thereof.

What is claimed is:

1. A communication apparatus comprising:
   a processor; and
   a memory storing program instructions executable by the processor, wherein
   the processor is configured to execute the program instructions stored in the memory to:
   calculate a bandwidth for each application of a plurality of applications;
   calculate a bandwidth change rate for each application based on the bandwidth for the application presently calculated and the bandwidth for the application previously calculated;
   sort the applications based on the bandwidth change rate for each application; and
   select a policy to be applied to communication traffic between a server and a terminal, using ranking information of the applications sorted by the bandwidth change rate for each application.

2. The communication apparatus according to claim 1, wherein the processor is configured to execute the program instructions stored in the memory to further:
   control the communication traffic according to the policy selected.

3. The communication apparatus according to claim 1, wherein the processor is configured to execute the program instructions stored in the memory to further:
   calculate periodically the bandwidth change rate for each application.

4. The communication apparatus according to claim 3, wherein the processor is configured to execute the program instructions stored in the memory to further:
   sort the bandwidth change rates calculated for the applications in descending order to select the policy to be applied to the communication traffic using the ranking information.

5. The communication apparatus according to claim 3, further comprising
   a policy management table that holds the policy to be applied to the communication traffic of each application,
   wherein the processor is configured to execute the program instructions stored in the memory to further:
   select, as the application to be prioritized, the application for which the bandwidth change rate maintains a ranking higher than a predetermined ranking over a prescribed time period, during which calculation of the bandwidth change rates for each application and sorting of the applications based on the bandwidth change rate for each application are each performed a plurality of times, to obtain the policy corresponding to the application to be prioritized from the policy management table.

6. The communication apparatus according to claim 5, wherein the processor is configured to execute the program instructions stored in the memory to further:
   apply the policy corresponding to the application to be prioritized obtained from the policy management table to the communication traffic.

7. The communication apparatus according to claim 6, wherein the processor is configured to execute the program instructions stored in the memory to further:
   calculate the bandwidth for each application, for each identifier of each of a plurality of base stations to which the terminal wirelessly connects.

8. The communication apparatus according to claim 7, further comprising
   a bandwidth management table that holds the bandwidth for each application, for each identifier of each base station.

9. A communication method for a communication apparatus that relays communication between a server and a terminal, the communication method comprising:
   calculating a bandwidth for each application of a plurality of application;

calculating a bandwidth change rate for each application based on a presently calculated bandwidth for the application and a previously calculated bandwidth for the application;

sorting the applications based on the bandwidth change rate for each application; and selecting a policy to be applied to communication traffic between a server and a terminal, using ranking information of the applications sorted by the bandwidth change rate for each application.

10. A non-transitory computer readable medium storing a program causing a computer included in a communication apparatus that relays communication between a server and a terminal to execute processing comprising:

calculating a bandwidth for each application of a plurality of application;

calculating a bandwidth change rate for each application based on a presently calculated bandwidth for the application and a previously calculated bandwidth for the application;

sorting the applications based on the bandwidth change rate for each application; and selecting a policy to be applied to communication traffic between a server and a terminal, using ranking information of the applications sorted by the bandwidth change rate for each application.

11. The communication method according to claim 9, comprising in the selecting the policy, sorting the bandwidth change rates calculated for the applications in descending order to select the policy to be applied to the communication traffic using the ranking information.

12. The communication method according to claim 11, further comprising:

calculating periodically the bandwidth change rate for each application; and in the selecting the policy, selecting, as the application to be prioritized, the application for which the bandwidth change rate maintains a ranking higher than a predetermined ranking over a prescribed time period, during which calculation of the bandwidth change rates for each application and sorting of the applications based on the bandwidth change rate for each application are each performed a plurality of times, to obtain the policy corresponding to the application to be prioritized from the policy management table.

13. The communication method according to claim 12, further comprising controlling the communication traffic according to the selected policy corresponding to the application to be prioritized obtained from the policy management table.

14. The communication method according to claim 13, comprising calculating the bandwidth for each application, for each identifier of each of a plurality of base stations to which the terminal wirelessly connects.

15. The communication method according to claim 14, comprising storing the calculated bandwidth for each application in a bandwidth management table that holds the bandwidth for each application, for each identifier of each base station.

16. The non-transitory computer readable medium according to claim 10, storing the program causing the computer to execute processing comprising in the selecting the policy, sorting the bandwidth change rates calculated for the applications in descending order to select the policy to be applied to the communication traffic using the ranking information.

17. The non-transitory computer readable medium according to claim 16, storing the program causing the computer to execute processing comprising:

calculating periodically the bandwidth change rate for each application; and in the selecting the policy, selecting, as the application to be prioritized, the application for which the bandwidth change rate maintains a ranking higher than a predetermined ranking over a prescribed time period, during which calculation of the bandwidth change rates for each application and sorting of the applications based on the bandwidth change rate for each application are each performed a plurality of times, to obtain the policy corresponding to the application to be prioritized from the policy management table.

18. The non-transitory computer readable medium according to claim 17, storing the program causing the computer to execute processing comprising:

controlling the communication traffic according to the selected policy corresponding to the application to be prioritized obtained from the policy management table.

19. The non-transitory computer readable medium according to claim 18, storing the program causing the computer to execute processing comprising:

calculating the bandwidth for each application, for each identifier of each of a plurality of base stations to which the terminal wirelessly connects.

20. The non-transitory computer readable medium according to claim 19, storing the program causing the computer to execute processing comprising:

storing the calculated bandwidth for each application in a bandwidth management table that holds the bandwidth for each application, for each identifier of each base station.

* * * * *